Jan. 27, 1970  J. BRANGER  3,491,586

FATIGUE TESTING APPARATUS

Filed Jan. 23, 1968  3 Sheets-Sheet 1

INVENTOR.
Jürg Branger
BY Michael S. Striker
Attorney

United States Patent Office 3,491,586
Patented Jan. 27, 1970

3,491,586
FATIGUE TESTING APPARATUS
Jürg Branger, Libellenstrasse 65, Lucerne, Switzerland
Filed Jan. 23, 1968, Ser. No. 699,881
Claims priority, application Switzerland, Jan. 26, 1967,
1,122/67
Int. Cl. G01n 3/00
U.S. Cl. 73—91                                             15 Claims

ABSTRACT OF THE DISCLOSURE

A fatigue testing apparatus for subjecting a plurality of test rods simultaneously to alternating loads of the same magnitude, in which the test rods are arranged parallel to each other and connected at opposite ends thereof to support means equally spaced from and uniformly distributed about the axis of the latter and in which central power supply means located along the aforementioned axis cooperate with attaching means connected to one of the ends of the test rods to apply an equal load to each of the test rods. Preferably, the testing apparatus includes also one or two air circulating systems for blowing hot or cold air about the test rods to change the temperature of the latter while under load.

BACKGROUND OF THE INVENTION

The present invention relates to a fatigue testing apparatus constructed to subject a plurality of test rods to loads of varying magnitude.

The fatigue strength of a material is usually determined in such a manner that test rods of proper configuration are subjected to alternating loads in a testing machine until the test rod breaks. While in former times so-called one-step testing programs have nearly exclusively been used in which during the test upper and lower load limits applied to the test rod have always been maintained, at the present time the testing programs are more complicated and all, during the actual use of the material occurring loads, are applied to the test rod, whereby these loads are preferably arranged in a sequence as they occur in actual practice.

In modern testing practice operating loads as they occur during use of the material are simulated as exactly as possible and the material is also subjected to temperature changes if in use the material is subjected to varying temperatures.

Usually, a plurality of test rods having, as far as possible, the same dimensions are manufactured and these test rods are then subjected one by one in the same testing apparatus to the same testing program. But even under such conditions, the obtained test results vary, as known, to a considerable extent. The test results vary to a greater extent in test rods having uniform dimensions throughout their length than in test rods provided with portions of reduced dimensions in which during testing stress concentrations will occur. The greater the variation in the test results is, the greater will be the safety margin which has to be assumed, which evidently will increase the cost of the components manufactured by the tested material. The avoidance of all factors which increase the variation of the test results is therefore of utmost importance.

Among these factors are errors in the test program, i.e., deviations from the set-up program, which may accidentally occur and which result in increases of the test result variations when the test rods are one after the other tested in the same testing apparatus. In so-called chain-testing apparatus, in which a plurality of test rods are arranged in a chain and subjected simultaneously to the same loads, such program errors will not lead to a variation of the test results. However, when during the fatigue tests the test rods are to be not only subjected to varying mechanical loads, but also to changing temperatures, it is difficult in such testing machines to assure that all test rods of the chain have always the same temperature and that temperature variation will occur in all test rods at the same time and to the same extent to thus avoid variations of the test results in the various rods of the tested chain. So-called chain testing apparatus have also the disadvantage that the load-change frequency has to be considerably smaller than in testing apparatus in which a single rod is tested, since the elastic deformation of the chain of test rods is a multiple of that of a single test rod. This factor detrimentally increases the necessary testing time.

It is an object of the present invention to provide for a fatigue testing apparatus which avoids the above mentioned disadvantages of fatigue testing apparatus known in the art.

It is a further object of the present invention to provide for a fatigue testing apparatus in which a plurality of test rods can simultaneously be tested and be subjected during the test to exactly the same testing conditions.

It is also an object of the present invention to provide for a fatigue testing apparatus of the aforementioned kind which is constructed of relatively few and simple parts so that the testing apparatus may be manufactured at reasonable cost and will stand up perfectly under extended use.

SUMMARY OF THE INVENTION

With these objects in view, the fatigue testing apparatus according to the present invention for subjecting a plurality of test rods simultaneously to alternating loads mainly comprises support means having an axis, attaching means carried by the support means and connectable to opposite ends of the test rods for mounting the plurality of test rods on the support means parallel to each other and to the axis of the support means and equally spaced from the latter, and power supply means located along the aforementioned axis equally spaced from the test rods connected to the attaching means and cooperating with the attaching means to apply the same load to each of the test rods.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
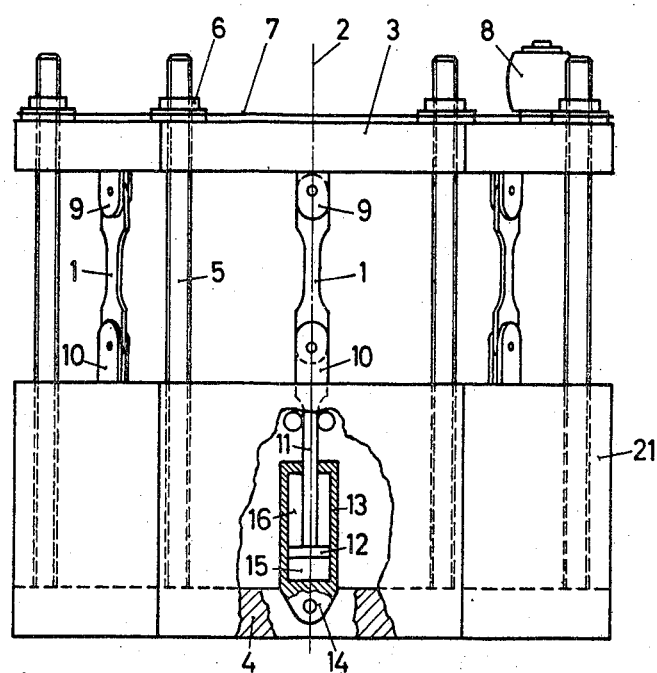
FIG. 1 is a partially sectioned side view of a fatigue testing apparatus according to the present invention constructed for simultaneously testing six test rods.
Figure 2:
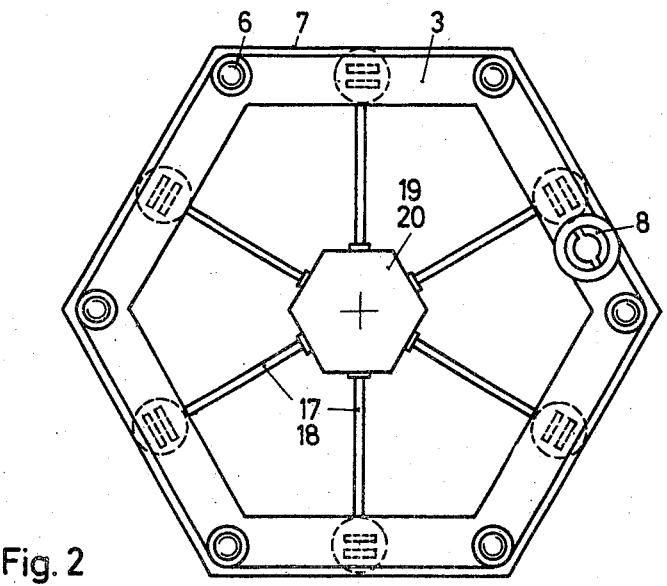
FIG. 2 is a top view of the testing apparatus shown in FIG. 1.

The fatigue testing apparatus shown in FIGS. 1 and 2 is designed for simultaneously testing six test rods 1. The apparatus illustrated in these figures comprises support means having a longitudinal axis 2 and including a pair of support members 3 and 4 spaced in axial direction from each other and each preferably formed by beam means connected to each other in any convenient manner to form a rigid polygon as clearly shown in FIG. 2, in which the polygon is a hexagon. Preferably adjustable spacer means are provided for holding the support members 3 and 4 spaced in the direction of the axis 2 a variable distance from each other so as to adapt the testing apparatus for use with test rods of different lengths. For this purpose, the spacer means may be in the form of, for instance, six, screw spindles 5 respectively arranged at the corners of the aforementioned hexagons and fixed at the lower ends in any convenient manner, not shown in the drawing, to the lower support member 4. The screw spindles 5 extend with the upper end portions thereof with clearance through appropriate bores in the upper support member 3 and each of the screw spindles is provided in the region of its upper end with a nut 6 threadingly engaged with the thread of the respective screw spindle 5 and turnably carried in the upper support member while being fixed, in any convenient manner well known in the art, for movable in axial direction with the upper support member 3. By turning each of the nuts 6 through the same angle about its axis, the upper support member 3 may therefore be moved toward or away from the lower support member 4. In order to turn the nuts 6 simultaneously and through the same angles about their axes, the outer portion of each nut may be in the form of a sprocket wheel and be engaged by a sprocket chain 7, schematically indicated in FIGS. 1 and 2, which extends in an endless loop about all nuts 6 and which may be driven in one or the other direction by a small reversible electric motor 8 carried on the upper support member 3 and cooperating with the sprocket chain 7 to drive the latter in the one or the other direction.

Instead of a sprocket chain drive, an endless belt or a cable drive may also be used, in which case the outer peripheries of the nuts are formed as pulleys.

The testing apparatus includes further bifurcated attaching members 9 and 10 of known construction which are connected to opposite ends of the test rods 1 in the usual manner by small cross pins extending through aligned bores in the test rods and the attaching members. The upper attaching members 9 are fixedly connected, for instance by welding, to the upper support member 3, whereas the lower attaching members 10 are each integrally connected at the lower end thereof to a piston rod 11 extending parallel to the axis 2 and guided for movement in vertical direction while being prevented from buckling under excessive loads in any convenient manner known in the art, for instance by a pair of rollers as indicated in FIG. 1. Each piston rod 11 carries at its lower end a piston 12 which is slidably guided in a cylinder 13 which is integrally formed at its lower end with a tongue 14 which is anchored in any convenient manner in the lower support member 4 which may for instance be constructed as a U-beam.

The test rods 1 are tensioned or compressed by feeding pressure-fluid into the cylinder 13 respectively to opposite sides of the piston 12 therein. In order to assure that all of the test rods are subjected to the same stresses, the pressure spaces 15 and 16 of the cylinder 13 are respectively connected through radial pressure conduits 17 and 18 with power supply means 19 respectively 20 which are located one above the other along the axis 2 of the apparatus and which serve to supply the aforementioned pressure spaces 15 and 16 alternatingly with pressure-fluid through conduits 17 and 18. Since the pressure spaces in all cylinders 13 are supplied over conduits of equal lengths from a central pressure supply means, it is evident that the same pressure will always be maintained in the pressure spaces 15 and/or 16 of the cylinders 13. This will assure that the same forces are simultaneously exerted on all of the pistons 12. This will also be the case if the forces are changed by hydraulic pressure waves which may occur during rapid change of the pressure in the central power supply means or distributors 19 and 20, since due to the symmetrical arrangement all forces will be simultaneously changed. The fatigue testing apparatus of the present invention permits therefore to subject a plurality of test rods simultaneously to exactly alike test conditions, whereby the necessary testing time will not be longer than the testing time required for testing a single test rod.

The hydraulic pressure which is fed through the pressure conduits 17 and 18 to the working cylinders 13 is produced in a known manner, for instance by a pressure pump and a control valve which is automatically operated from a programming device of known construction. These known devices, which are not shown in the drawing, may in their entirety or in part be arranged in a similar manner as the distributing members 19 and 20 in the space between the support members 3 and 4, preferably in the region of the lower support member 4, whereby advantageously a cover 21 is provided to enclose the aforementioned devices. The devices for producing the necessary fluid pressure may also be arranged outside the testing apparatus illustrated in FIGS. 1 and 2, and in this case appropriate pressure conduits are provided to connect the pressure producing devices to the central distributing members 19 and 20.

The corners of the polygons formed by the beams 3 and 4 do not have to correspond to the number of testing rods to be used and evidently the number of the corners can be half of the number of the testing rods or twice this number. It is also possible to arrange the spindles 5 only at every second corner of the polygon.

Figure 3:
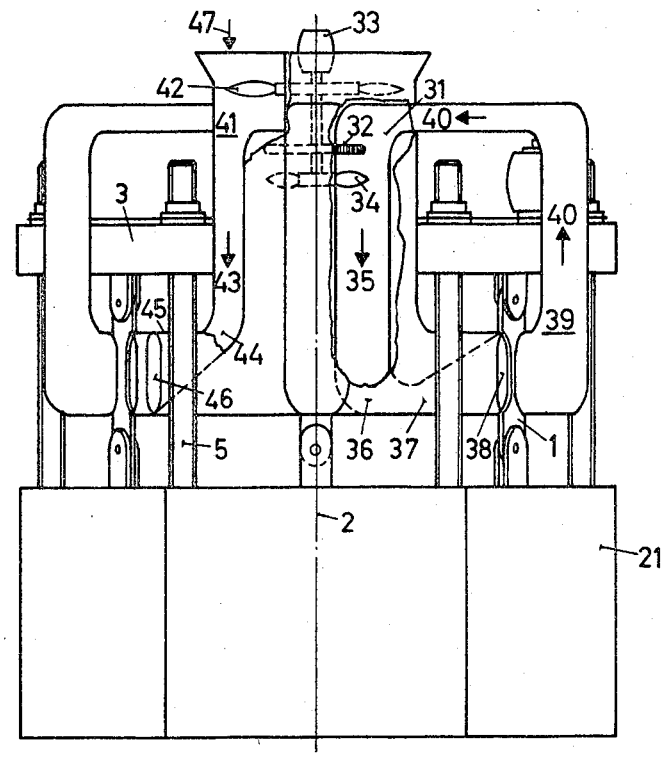
FIG. 3 is a partially sectioned side view of another testing apparatus according to the present invention and provided with means for subjecting the test rods also to temperature variations during the testing.
Figure 4:
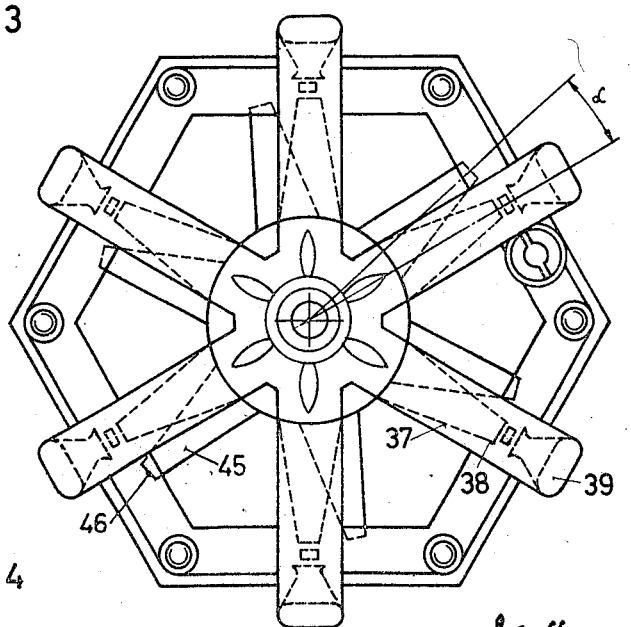
FIG. 4 is a top view of the testing apparatus shown in FIG. 3.

FIGS. 3 and 4 illustrate a second embodiment of a fatigue testing apparatus according to the present invention in which the test rods 1 may not only be subjected to varying loads but also simultaneously to different temperatures. The means for supporting the test rods in the apparatus and for subjecting the test rods simultaneously to varying loads in the apparatus as shown in FIGS. 3 and 4 are exactly the same as in the above-described apparatus illustrated in FIGS. 1 and 2 and therefore this part of the construction of the testing apparatus need not be further described.

The means for subjecting the test rods to varying temperatures comprise in the apparatus illustrated in FIGS. 3 and 4 a central channel 31 substantially closed at the upper and lower ends therof and extending coaxially with the central axis 2 of the apparatus. Air heating means 32 of known construction and which may, for instance, be electrically heated, are provided in an upper portion of the central channel 31 and below the air heating means 32 is a blower wheel 34 arranged which is driven by a small electric motor 33 and constructed to suck air over the air heater 32 and to blow the air in downward direction as indicated by the arrow 35 through the central channel 31. The lower portion of the central channel 31 terminates in a central distributor housing 32 from which six radial channels 37 extend uniformly spaced from each other in radially outward direction. The open ends 38 of the radial channels are respectively directed to sides of the test rods 1 facing the axis 2 so that the test rods are simultaneously impinged by the hot air passing through the radial channels 37. Since the air channels 31, 36 and 37 are, as well as the test rods, arranged symmetrically with regard to the longitudinal axis 2 of the apparatus, all of the test rods will assume the same temperature, which may be constant if the temperature of the air streams is maintained constant, or which may vary if the air heater means is regulatable so as to vary the temperature of the air streams.

Advantageously, the heated air blown from one side against the test rods 1 is at least in part fed from the other side of the test rods back to the air heater 32 and for this purpose the apparatus preferably includes a plurality of additional channels 39 having open ends substantially aligned with the open ends 38 of the radial channels 37 and located on the other sides of the test rods 1, which additional channels are arranged, as clearly shown in FIGS. 3 and 4, to lead the heated air in the direction of the arrows 40 back to the central channel 31 so that the bolwer 34 will circulate at least part of the air through the channel arrangement. This arrangement not only provides for an improved heat economy, but this arrangement also avoids undue heating of the room in which the testing apparatus is mounted by the hot air emanating from the radial channels 37.

The testing apparatus illustrated in FIGS. 3 and 4 is preferably provided with a second air circulating system communicating with the ambient air to permit a quick temperature change in the test rods by forced cooling of the same. The aforementioned second air cooling system preferably comprises an annular channel 41 arranged coaxially with and surrounding the channel 31 and which communicates at the upper end thereof with the outer atmosphere. A blower 42 is arranged in the upper portion of the annular channel 41 coaxially with the blower 34, and arranged to suck air through the open upper end of the channel 41 and to blow this air downwardly as indicated by the arrow 43. The blower 42 may be mounted on the same shaft as the blower 34 to be driven simultaneously with the latter from the motor 33. On the other hand, the blower 32 may be mounted on a hollow shaft so that by means of an appropriate coupling, not shown in the drawing, the motor 33 may be selectively connected to the blower 34 or the blower 42. The annular channel 41 communicates at the lower end thereof with an annular distributor housing 44 from which a plurality of radial channels 45 extend in radially outward direction. The radial channels 35 are angularly displaced with regard to the radial channels 37 through which hot air may be blown. The radial channels 35 have outer open ends 46 radially spaced a small distance from the test rods 1 so that when the open ends 46 are aligned with the test rods, air of room temperature will be blown against the test rods, whereafter the air escapes into the surrounding atmosphere. During operation of the blower 42, fresh air from the surrounding atmosphere is continually sucked in the direction of the arrow 47 into the second air circulating system.

The above described two air-circulating systems are fixedly connected to each other and are mounted, in a known manner not shown in the drawing, for turning movement about the axis 2. By turning the two interconnected air circulation systems through the angle α (FIG. 4) it is possible to alternately subject the test rods to streams of hot air passing through the radial channels 37 or to air streams having room temperature and passing through the radial channels 45.

If the fatigue testing machine is automatically operated by a programmer, the turning of the two air circulation systems in one or the other direction and in any desired frequency may also be controlled by the programmer in a manner known per se.

Figure 5:
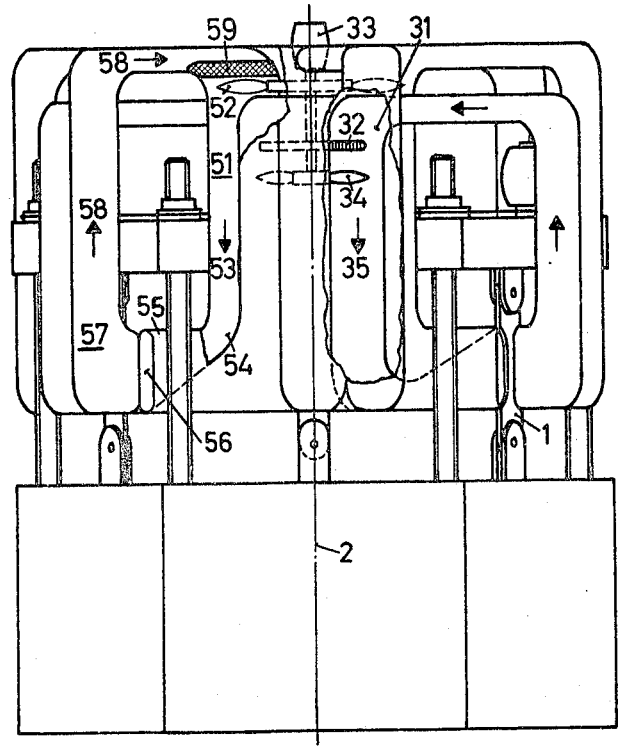
FIG. 5 is a partially sectioned side view of a further testing apparatus according to the present invention in which the test rods can be subjected to greater temperature variations than in the embodiment shown in FIG. 3.
Figure 6:
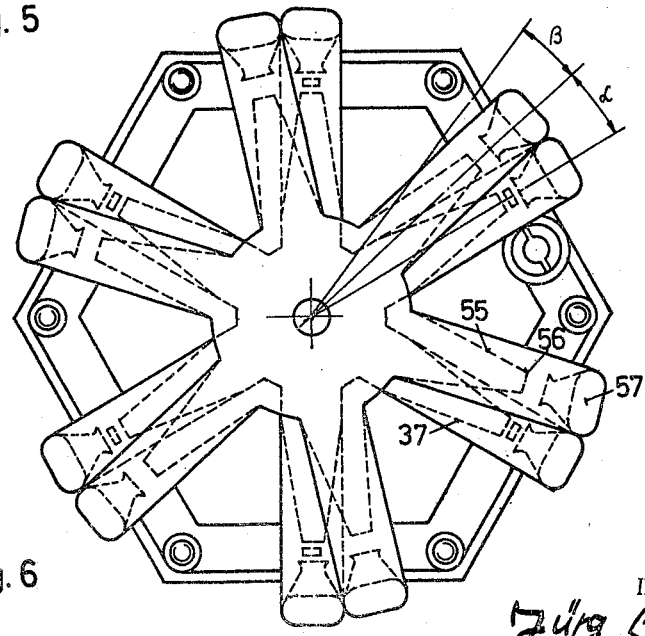
FIG. 6 is a top view of the apparatus shown in FIG. 5.

FIGS. 5 and 6 illustrate a further embodiment of a testing apparatus according to the present invention which is constructed to permit to subject the test rods to very fast temperature change and to cool the test rods to a temperature lower than room temperature, for which purpose the apparatus is likewise provided with a second air cooling system in which cooled air is circulated. The second air cooling system of the apparatus shown in FIGS. 5 and 6 likewise includes an annular central channel 51 arranged coaxially to the channel 31 of the first air cooling system constructed as described above. A blower 52 is provided in an upper portion of the channel 51 adapted to blow air in downward direction as indicated by the arrow 53. The blower 52 may be arranged on the same shaft as the blower 34 to be driven simultaneously with the latter from the motor 33. On the other hand, the shaft of the blower 52 may be a hollow shaft so that by provision of an appropriate coupling, not shown in the drawing, the shaft of the blower 34 or that of the blower 52 may be selectively connected to the motor 33 to be driven thereby.

The annular channel 51 communicates at the lower end thereof with an annular distribution housing 54 from which radial channels 55 extend in outward direction. The radial channels 55 are angularly displaced with respect to the radial channels 37 of the first air cooling system. The radial channels 55 have open outlet ends 56 arranged a small radial distance from the test rods 1. Additional channels 57 having open ends respectively aligned with the open ends 56 of the radial channels 55 are provided and adapted to feed the air blown through the radial channels against the test rods 1 back in the direction of the arrow 58 and through an air cooling device 59 of known construction arranged at the region of the upper end of the annular channel 51 so that the blower 52 will continuously circulate cooled air through the second air circulating system.

The two above described air circulating systems through which respectively heated or cold air may be blown against the test rods 1 are again fixedly conneced to each other and mounted in any appropriate manner, not illustrated in the drawing, for turning movement about the axis 2 of the apparatus so that by turning the two interconnected air circulating systems through an angle α (FIG. 6) in one or the other direction the test rods may be alternatingly subjected to the influence of hot air streams passing through the radial channels 37 or to cold air streams passing through the radial channels 55. Preferably, the two air circulating systems may also be turned through a further angle, for instance an angle β, indicated in FIG. 6, to a position which will facilitate mounting and dismounting of the test rods 1 in the testing apparatus.

It is to be understood that the means of the apparatus shown in FIGS. 5 and 6 for subjecting the test rods to mechanical loads are the same as described in connection with FIG. 1.

If the fatigue testing apparatus is automatically controlled by a programmer, the alternate turning of the air circulating systems is perferably also controlled from the programmer.

It will be understood that each of the elements described above, or two or more together, may also find a useful application in other types of fatigue testing apparatus for simultaneously testing a plurality of test rods under exactly equal test conditions differing from the types described above.

While the invention has been illustrated and described as embodied in a fatigue testing apparatus for simultaneously testing a plurality of test rods under exactly the same testing conditions in which the test rods are not only subjected to varying loads but also to changing temperature conditions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A fatigue testing apparatus for subjecting a plurality of test rods simultaneously to alternating loads, comprising, in combination, support means having an axis; attaching means carried by said support means and connectable to opposite ends of the test rods for mounting the plurality of test rods on the support means parallel to each other and to said axis and equally spaced from the latter; and power supply means located along said axis equally spaced from said rods connected to said attaching means and cooperating with said attaching means for applying the same alternating load to each of said test rods.

2. A fatigue testing apparatus as defined in claim 1, wherein said attaching means are uniformly distributed about said axis.

3. A fatigue testing apparatus as defined in claim 2, wherein said support means comprises a pair of rigid support members spaced from each other in direction of said axis, and wherein said attaching means comprise a first plurality of attaching members fixedly carried by one of said support members and a second plurality of attaching members carried by the other of said pair of support members movable in a direction parallel to said axis, said power supply means cooperating with said second attaching members.

4. A fatigue testing apparatus as defined in claim 3, wherein said attaching means comprise a cylinder means and a piston means slidably arranged in said cylinder means for each of said second plurality of attaching members, one of said last-mentioned means being fixed to a respective one of said second plurality of attaching members and the other of said last-mentioned means being fixed to said other of said pair of support members, and said power supply means comprising central pressure distributing means located along said axis and connected by pressure conduits of equal length to said cylinder means.

5. A fatigue testing apparatus as defined in claim 4, wherein at least one of said support members comprises rigid beam means connected to a polygon.

6. A fatigue testing apparatus as defined in claim 3, and including adjustable spacer means extending between said support members for adjusting the axial distance between the latter.

7. A fatigue testing apparatus as defined in claim 6, wherein said adjustable spacer means comprise a plurality of spindles extending parallel to said axis and fixedly carried by one of said support members, a plurality of nuts respectively threadingly engaged with said spindles and carried by the other of said support members turnably about the respective spindle axis but immovably in axial direction with respect to said other support member, and means connected to said nuts for simultaneously turning the same through equal angles.

8. A fatigue testing apparatus as defined in claim 2, and including blower means for blowing air against test rods connected to said attaching means to change the temperature of said test rods.

9. A fatigue testing apparatus as defined in claim 8, wherein said blower means comprise a central channel coaxial with said axis, a plurality of substantially radial channels communicating at inner ends thereof with one end of said central channel and having outer open outlet ends respectively directed towards the test rods, and a blower in said central channel for sucking air through the other end of said central channel into the latter and to blow the air through the radial channels against one side of each of the test rods.

10. A fatigue testing apparatus as defined in claim 9, and including a plurality of additional channels having open inlet ends respectively facing the other sides of the test rods and being connected at the other ends thereof to said other end of said central channel.

11. A fatigue testing apparatus as defined in claim 9, and including heating means in said central channel.

12. A fatigue testing apparatus as defined in claim 8, wherein said blower means includes two separated air circulating systems, each including a central channel coaxial with said axis, a plurality of radial channels each communicating at an inner end thereof with one end of said central channel and having an opposite open outlet end adapted to face a respective test rod, a blower in each central channel for circulating air through the respective air circulating system, and heating means in the central channel of one air circulating system, the radial channels of one air circulating system being angularly displaced through a given angle with regard to the radial channels of the other circulating system and the channels of the two systems being turnably about said axis so that the test rods may be subjected to the heated air circulated through said one system and to the cool air circulated through said other system by turning said channels about said axis through said given angle in one or the other direction.

13. A fatigue testing apparatus as defined in claim 12, and including air cooling means in the central channel of said other system.

14. A fatigue testing apparatus as defined in claim 12, wherein the channels of said two air circulating systems are connected to each other for simultaneous rotation about said axis.

15. A fatigue testing apparatus as defined in claim 14, and including for each of the two air circulating systems a plurality of additional channels each having an open inlet end adapted to face a respective test rod at the side thereof opposite the side faced by the open outlet end of the respective radial channel, and each connected at the other end thereof to the other end of the central channel of the respective air circulating system.

References Cited

UNITED STATES PATENTS

| | | | |
|---|---|---|---|
| 2,185,340 | 1/1940 | Howe | 73—95 X |
| 2,709,359 | 5/1955 | Koch et al. | 73—91 X |
| 3,331,242 | 7/1967 | Schwarz et al. | 73—103 |

JERRY W. MYRACLE, Primary Examiner

U.S. Cl. X.R.

73—15.6